(12) United States Patent
Chen et al.

(10) Patent No.: US 7,852,376 B2
(45) Date of Patent: Dec. 14, 2010

(54) IMAGE-BASED METHOD AND SYSTEM FOR BUILDING SPHERICAL PANORAMAS

(76) Inventors: Ju-Wei Chen, Fl. 4, Alley 4, Lane 393, Sec. 2, Kuang Fu Road, Hsinchu (TW); Shu-Cheng Huang, #10, Lane 55 Cheng-Jueng Street, Tainan City (TW); Tse Cheng, #73, 77 Lane 160 Ching-Tsao Lake, Hsinchu (TW)

( * ) Notice: Subject to any disclaimer, the term of this patent is extended or adjusted under 35 U.S.C. 154(b) by 431 days.

(21) Appl. No.: 11/949,197

(22) Filed: Dec. 3, 2007

(65) Prior Publication Data

US 2008/0074500 A1 Mar. 27, 2008

Related U.S. Application Data

(60) Continuation of application No. 10/235,609, filed on Sep. 4, 2002, now Pat. No. 7,317,473, which is a division of application No. 09/085,479, filed on May 27, 1998, now Pat. No. 6,486,908.

(51) Int. Cl.
H04N 5/225 (2006.01)
(52) U.S. Cl. .................................... 348/218.1; 348/37
(58) Field of Classification Search ............... None
See application file for complete search history.

(56) References Cited

U.S. PATENT DOCUMENTS

| | | | |
|---|---|---|---|
| 5,083,389 A * | 1/1992 | Alperin .................... 40/539 |
| 5,185,667 A | 2/1993 | Zimmermann |
| 5,259,584 A * | 11/1993 | Wainwright ............... 248/542 |
| 5,313,306 A | 5/1994 | Kuban et al. |
| 5,359,363 A | 10/1994 | Kuban et al. |
| 5,384,588 A | 1/1995 | Martin et al. |
| 5,396,583 A | 3/1995 | Chen et al. |
| 5,446,833 A | 8/1995 | Miller et al. |
| 5,561,756 A | 10/1996 | Miller et al. |
| 5,963,213 A | 10/1999 | Guedalia et al. |
| 6,005,987 A * | 12/1999 | Nakamura et al. .......... 382/294 |
| 6,011,558 A | 1/2000 | Hsieh et al. |
| 6,018,349 A | 1/2000 | Szeliski et al. |
| 6,020,931 A | 2/2000 | Bilbrey et al. |
| 6,028,584 A | 2/2000 | Chiang et al. |
| 6,157,747 A | 12/2000 | Szeliski et al. |

(Continued)

OTHER PUBLICATIONS

McCullough, "Photographic Topography", Industry Magazine, No. 54, Jan. 1893.*

(Continued)

*Primary Examiner*—Lin Ye
*Assistant Examiner*—Dennis Hogue
(74) *Attorney, Agent, or Firm*—Woodcock Washburn LLP

(57) ABSTRACT

The invention relates to building spherical panoramas for image-based virtual reality systems. The image-based spherical panoramas can be navigated in any desired view direction (360-degrees) by suitable three-dimensional image browsers or viewers. The method and system also includes computing the number of photographs required to be taken and the azimuth angle of the center point of each photograph for building a spherical environment map representative of the spherical panorama. The method and system also includes an algorithm for computing the accurate azimuth angles of these taken photographs and seaming them together to build the spherical environment map.

26 Claims, 9 Drawing Sheets

U.S. PATENT DOCUMENTS

| | | | |
|---|---|---|---|
| 6,304,284 B1 * | 10/2001 | Dunton et al. ................ 348/36 |
| 6,327,381 B1 | 12/2001 | Rogina et al. |
| 6,337,708 B1 * | 1/2002 | Furlan et al. .................. 348/36 |
| 6,385,349 B1 | 5/2002 | Teo |
| 6,389,179 B1 * | 5/2002 | Katayama et al. ........... 382/284 |
| 6,593,969 B1 | 7/2003 | Driscoll, Jr. et al. |
| 6,686,970 B1 | 2/2004 | Windle |
| 2001/0010546 A1 | 8/2001 | Chen |

OTHER PUBLICATIONS

Bogner, "An Introduction to Panospheric Imaging," Proceedings of the 1995 IEEE International Conference on Systems, Man and Cybernetics, pp. 3099-3106, 1995.*

* cited by examiner

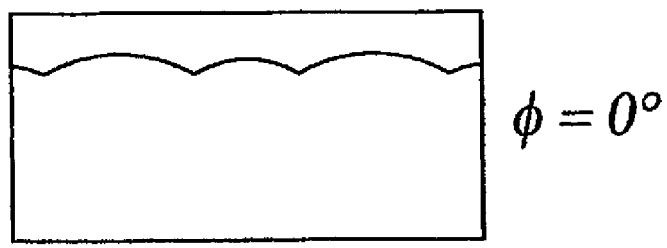
FIG. 7A  $\phi = 0°$
FIG. 7B  $\phi = 30°$
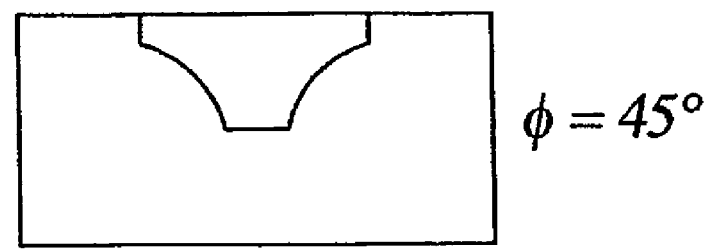
FIG. 7C  $\phi = 45°$
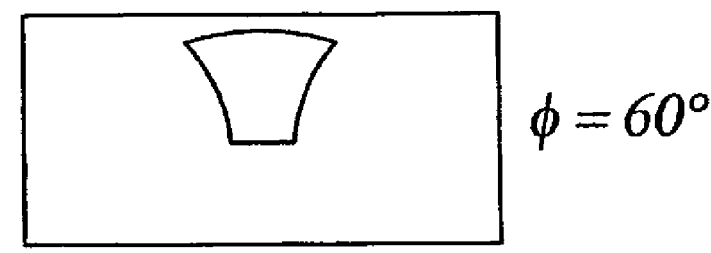
FIG. 7D  $\phi = 60°$
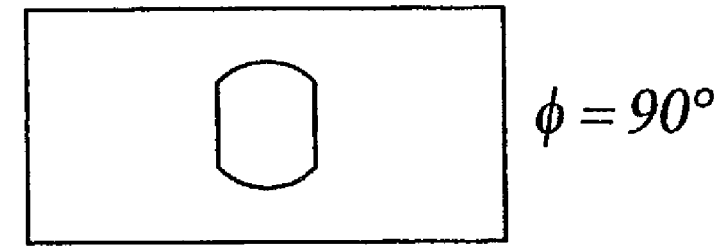
FIG. 7E  $\phi = 90°$

IMAGE-BASED METHOD AND SYSTEM FOR BUILDING SPHERICAL PANORAMAS

CROSS REFERENCE TO RELATED APPLICATIONS

This application is a continuation of U.S. patent application Ser. No. 10/235,609, filed Sep. 4, 2002, now U.S. Pat. No. 7,317,473, which is a divisional of U.S. patent application Ser. No. 09/085,479, filed May 27, 1998, now U.S. Pat. No. 6,486,908.

BACKGROUND OF THE INVENTION

The present invention relates to building photographic panoramas of virtual reality and in particular to building spherical environmental maps utilizing some photographs.

In virtual reality systems, synthesis and navigation of virtual environments are usually accomplished using one of the following approaches: 1) three-dimensional modeling and rendering; 2) branching movies; and 3) image-based approach.

Although three-dimensional modeling and rendering is the traditional approach, creating the three-dimensional geometrical entities is a laborious manual process, and special hardware (e.g., a graphic accelerator) may be necessary for rendering, in real time, a highly complex scene.

The branching movies approach is used extensively in the video game industry. Multiple movie segments are connected together to depict spatial paths of selected branch points. This approach is limited in navigability and interaction, and also requires a large amount of storage space to store movies.

For rendering complex scenes, such as real-world scenery, the image-based approach is often considered to be the most reasonable and feasible approach. The image-based approach renders scenes within a fixed time as well as independently of rendering quality and scene complexity.

The image based approach uses an environment map, which is established from a collection of images and characterizes the appearance of a scene when viewed from a particular position. The environment map contains the pixel values used to display the scene. The image environment map is first wrapped onto an object surface having a certain geometry, such as a cube, a sphere, or a cylinder. Afterwards, by locating the viewing position at the geometrical center of the wrapped object, perspective-corrected views of scenes can be reconstructed from the image on the object surface during playback.

There are many types of environment maps for storing data including cubic maps, spherical maps, cylindrical maps, fish-eye or hemispherical maps, and planar maps. Some environments are capable of storing data of omni-directional scenes, while others cannot. Others have used two additional kinds of environment maps in experimental systems: 1) the textured cylinder-like prism, and 2) the texture sphere-like polyhedron (see e.g., W. K. Tsao, "Rendering scenes in the real world for virtual environments using scanned images", Master Thesis of National Taiwan University, Advisor: Ming Ouhyoung, 1996). Rendering methods for different types of environment maps are described in U.S. Pat. No. 5,396,583; U.S. Pat. No. 5,446,833; U.S. Pat. No. 5,561,756; and U.S. Pat. No. 5,185,667, all of which are incorporated herein by reference.

As for building image-based panoramas, commercially available software (e.g., the QuickTime VR authoring tool suite, from Apple Computer Inc.) can be used to create a seamless panoramic cylindrical image from a set of overlapping pictures. An improved method of a stitching method is described in Hsieh et al., U.S. Ser. No. 08/933,758, filed Sep. 23, 1997, which is incorporated herein by reference. Stitching together photographic images taken from a fish-eye lens is also described in the developer manual of InfinitePictures□, Inc. ("SmoothMove Panorama Web Builder", Developer Manual (Version 2.0) of InfinitePictures□, Inc., 1996).

Spherical environment maps are used to store data relating to a surrounding scene. There exists many types of spherical environment maps. Spherical mapping mechanisms are described in U.S. Pat. Nos. 5,359,363, 5,384,588, 5,313,306, and 5,185,667, all of which are incorporated herein by reference. The major advantage of spherical mapping systems is that the environment map is able to provide users with 360 degrees of both horizontal and vertical pannings of views within the mapped sphere. However, a common problem with spherical mapping systems relates to image acquisition. Generally, to acquire the image for a spherical environment map, users usually require special and relatively expensive cameras having fish-eye lenses. Two types of particular interest are the "spherical reflection" map and the "parametric spherical environment" map.

A "spherical reflection" map stores the image of an environment as an orthographic projection on a sphere representing a perfect reflection of the surrounding scene (Zimmermann U.S. Pat. No. 5,185,667). These images with circular shapes are all stored in respective square arrays of pixels. The major disadvantage of spherical reflection maps is that the orientations near the silhouette of the sphere (i.e., the ring-like shape when the sphere is orthographically projected on a sphere) are sampled very sparsely. This makes it more difficult to render the spherical reflection maps for omni-directional and interactive viewers.

SUMMARY OF THE INVENTION

The invention relates to building spherical panoramas or spherical environment maps for image-based virtual reality systems. The image-based spherical panoramas can be navigated in any desired view direction (360-degrees) by suitable three-dimensional image browsers or viewers.

In one aspect of the invention, a method of photographing pictures for building the spherical panoramas with a camera system includes determining a number of circles of latitude to build the spherical panorama on the basis of the focal length of the camera system, the height of photographic film used in the camera system, and an overlapping ratio between contiguous ones of the pictures, each circle of latitude including a series of contiguous pictures; and photographing the determined number of pictures.

The approach permits the use of a camera having a standard or wide-angled lenses rather than fish-eye lenses which are more expensive and less popular.

Embodiments of this aspect of the invention may include one or more of the following features.

Determining the number of circles of latitude includes calculating the following equation:

$$NumCirclesLandscape = \left\lceil \frac{180°}{(100-k)\% * \left[2\tan^{-1}\left(\frac{a}{2f}\right)\right]} - 1 \right\rceil$$

where:

a is the height of the photographic film;

f is the focal length of the camera system; and k is the overlapping ratio between contiguous pictures.

Alternatively, the number of circles of latitude can be determined by calculating the following equation:

$$NumCirclesPortrait = \left\lceil \frac{\left[180° - 2\tan^{-1}\left(\frac{b}{2f}\right)\right] + \left[2k\% * \tan^{-1}\left(\frac{a}{2f}\right)\right]}{(100-k)\% * \left[2\tan^{-1}\left(\frac{a}{2f}\right)\right]} \right\rceil$$

where:
a is the height of the photographic film;
b is the width of the photographic film;
f is the focal length of the camera system; and
k is the overlapping ratio between contiguous pictures.

In another aspect of the invention, a method of transforming photographic images of a panoramic scene into a spherical environment map includes warping each of the plurality of photographic images into a parametric spherical environment map; and image cutting each of the warped photographic images into a rectangular image based on an elevation angle of a predetermined sight direction.

This aspect of the invention provides a reliable and efficient approach for transforming photographic images into a spherical environment map. A spherical environment map can be linearly mapped using the spherical coordinate system, in which each pixel is specified in terms of the pixel's azimuthal angle around the horizon and its elevation angle below the north pole, denoted by $(\theta, \phi)$. Based on angles $(\theta_v, \phi_v)$ which define a picture's sight (or view) direction, a two-dimensional image of a picture can be transformed onto an image region of a spherical environment map using an image warping formula. This is regarded as one kind of coordinate transformation. Although each picture is taken based on the predefined sight direction, direction errors in taking pictures may exist. For computing the actual azimuth angles of camera sight direction, an additional coordinate transformation using the azimuthal coordinate system is performed. Using these computed azimuth angles, the picture images are seamed together into a spherical environment map utilizing an image stitching technique.

Embodiments of this aspect of the invention may include one or more of the following features.

During image cutting, the warped photographic images are cut either horizontally or vertically on the basis of the elevation angle of the sight direction for each of the warped photographic images. For example, if the elevation angle of the sight direction, relative to one of the poles, for a warped photographic image is less than 10° or greater than 170°, the warped photographic image is cut into a rectangular region defined by side edges of the warped photographic image and either a bottom or a top edge of the warped photographic image, respectively. On the other hand, if the elevation angle of the sight direction for a warped photographic image is between 30° and 150°, the warped photographic image is cut into a rectangular region defined by two opposing horizontal lines and two opposing vertical lines.

Warping each of the photographic images includes mapping each pixel of the warped photographic image from at least one pixel of an associated photographic image. The attributes (e.g., color) of each pixel of the warped photographic image are derived from at least one pixel of the associated photographic image.

In still another aspect of the invention, a method of stitching together a series of photographic images to build a spherical panorama, includes computing sight directions for each of the photographic images; adjusting the intensity of the photographic images to an intensity related to an average of the intensities of the photographic images; and stitching together contiguous ones of the photographic images.

Embodiments of this aspect of the invention may include one or more of the following features.

Computing sight directions includes performing both vertical and horizontal registration of contiguous photographic images. In one implementation, a correlation-based algorithm is used to compute image phase correlation for all possible positions of image alignment. The position with the minimum alignment difference is then selected. The results of performing horizontal and vertical registration are inspected with a software tool.

Vertical registering is used to derive vertical relationships between images. One approach for vertically registering contiguous photographic images includes rotating each photographic image 90°; image warping the rotated photographic image with $\phi_L$ set to 90°; performing horizontal registration of contiguous photographic images; and then determining sight directions from the image positions after image registration.

Horizontal registration is performed to derive horizontal relationships between images and is usually performed after vertical registration. The method can further include a second "fine-tuning" vertical registration.

Image blending of overlapping regions of the contiguous photographic images can also be performed. For example, intensity levels of pixels in the overlapping regions using the following equation:

$$I_{(r_i)} = \frac{d_A^t \cdot I(p_i) + d_B^t \cdot I(q_i)}{d_A^t + d_B^t}$$

where:
$p_i$ is the location of a pixel from a first one of the photographic images;
$q_i$ is the location of a pixel from a corresponding second one of the photographic images contiguous with the first one of the photographic images;
$d_A$ is the distance between location $p_i$ and a boundary of the first one of the photographic images;
$d_B$ is the distance between location $q_i$ and a boundary of the second one of the photographic images;
$I(p_i)$ is the intensity of the pixel at location $p_i$;
$I(q_i)$ is the intensity of the pixel at location $q_i$; and
$I(r_i)$ is the resultant intensity of the pixel.

When the panorama is navigated, an image browser for viewing spherical panoramas can retrieve the scene image from the spherical environment map based on the desired direction of view.

Other aspects of the invention include systems for implementing the methods described above. In particular, the systems are for photographing pictures of a panoramic scene for use in building a spherical panorama, for transforming photographic images of a panoramic scene into a spherical environment map, and for stitching together a two dimensional array of the photographic images to build a spherical panorama. The systems include computer-readable media having computer instructions for implementing the methods described above.

A computer-readable medium includes any of a wide variety of memory media such as RAM or ROM memory, as well as, external computer-readable media, for example, a computer disk or CD ROM. A computer program may also be downloaded into a computer's temporary active storage (e.g., RAM, output buffers) over a network. For example, the above-described computer program may be downloaded from a Web site over the Internet into a computer's memory. Thus, the computer-readable medium of the invention is intended to include the computer's memory which stores the above-described computer program that is downloaded from a network.

Other advantages and features of the invention will be apparent from the following description and from the claims.

BRIEF DESCRIPTION OF THE DRAWINGS

FIG. 7A-7E are a series of five warped images with φ set to 0°, 30°, 45°, 60°, and 90°.

DETAILED DESCRIPTION

In accordance with the invention, a "parametric spherical environment map" (PSEM) is used to store the data of an environment into a rectangular image in which the coordinates of each pixel are mapped to points on the surface of a sphere. The points are generally denoted by spherical coordinates (θ, φ).

Using a parametric spherical environment map (PSEM) to store the environment data of a spherical panorama has several advantages. The environment data of an entire spherical panorama can be included in a single contiguous image. All of the regions of the panorama are always sampled at least as much as the regions at the equator of the sphere so that the nearer to any pole a region is, the more oversampled will be that region. Based on the coordinates of both horizontal and vertical axes, the environment data of the desired sight direction can be easily retrieved from the map. "Translation" along lines of latitude in the map corresponds to "rotation" around the axis of two poles of a sphere.

Figure 1:
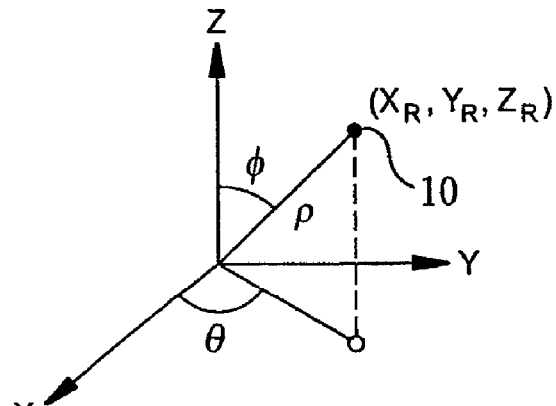
FIG. 1 illustrates the relationship between rectangular coordinates and spherical coordinates.

Referring to FIG. 1, in the rectangular (or Cartesian) coordinate system ($R^3$), a sphere of radius ρ can be represented with the following equation $$x_R^2 + y_R^2 + z_R^2 = \rho^2 \quad (1)$$

where (x, y, z) are the coordinate of any point 10 on the sphere.

Any point on a sphere of radius ρ can also be represented using the spherical coordinate system (ρ, θ, φ), where $0 \leq \theta < 2\pi$ and $0 \leq \phi < \pi$ to represent the angles in units of radians. Alternatively, $0° \leq \theta < 360°$ and $0 \leq \phi \leq 180°$ can be used to represent the angles in units of degrees. For any point on a sphere, the relationship between the rectangular coordinates ($X_R, Y_R, Z_R$) and its corresponding spherical coordinates (ρ, θ, φ) is as follows:

$$x_R = \rho \sin\varphi \cos\theta \quad (2)$$
$$y_R = \rho \sin\varphi \sin\theta$$
$$\{z_R = \rho \cos\varphi$$

Thus, for a sphere with a predefined radius ρ, the spherical surface has only two degrees of freedom, represented by two parameters, θ and φ.

Figure 2:
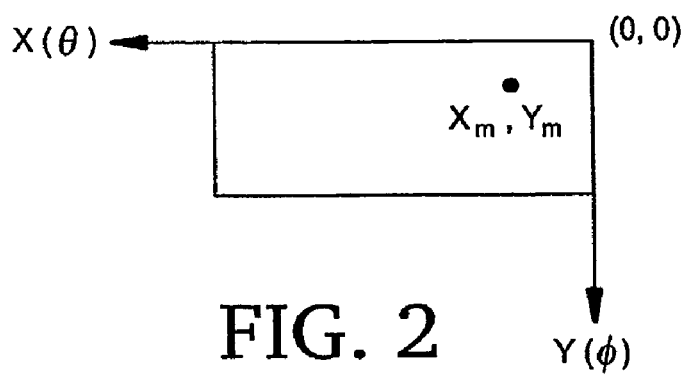
FIG. 2 shows a coordinate system of a parametric spherical environment map.

Referring to FIG. 2, two orthogonal axes (X and Y) can, therefore, be used to represent θ and φ, respectively. All points on the sphere surface will map to the pixels within a rectangular region bounded by the four lines: θ=0°, θ=360°, φ=0°, and φ=180°.

A rectangular image can be used to represent a parametric spherical environment map. When a rectangular image is used to store the image of a spherical panorama, the resolutions for each axis is defined in pixels/degrees. Typically, the resolutions of the two axes are defined to be the same. In this embodiment, the width of the PSEM is twice as long as the height of the PSEM. However, the axes can also be different. Assume that x_resolution_PSEM and y_resolution_PSEM are the predefined resolutions of the x and y axis, respectively. For any pixel in the PSEM with coordinates ($x_m, y_m$), the corresponding spherical coordinates θ and φ can be obtained from ($x_m, y_m$) as follows:

$$\theta = \frac{x_m}{\text{x\_resolution\_PSEM}} \quad (3)$$
$$\{\varphi = \frac{y_m}{\text{y\_resolution\_PSEM}}$$

Picture-Taking Procedure

Figure 3:
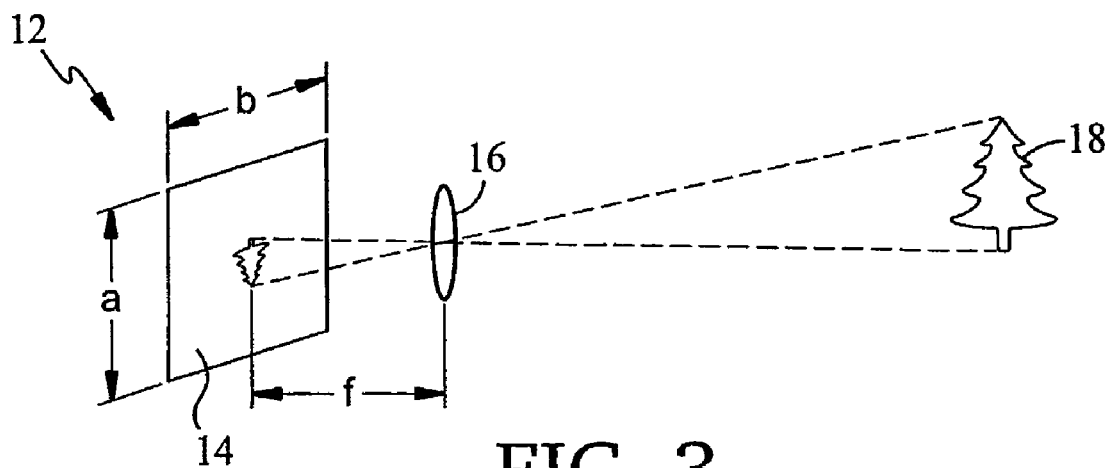
FIG. 3 illustrates the principle of taking pictures with a camera.

Referring to FIG. 3, the principle of taking pictures with a photographic system 12 for building a spherical panorama is illustrated. A photographic film 14 and camera lens 16 are the two primary components of photographic system 12. The distance between camera lens 16 and film 14 is the focal length or focal distance (f). An image of an object 18 is formed in inverse on film 14. The size of the image is proportional to the focal length, and is inversely proportional to the distance between the object and the camera. Therefore, the size of the view field captured by a single picture depends on the focal length, the film width, and the film height. As the focal distance increases, the view field decreases. However, a 360-degree panoramic scene cannot be shown in a single picture taken with a camera having a standard lens. Thus, more than one picture is needed to build a spherical panorama. The actual number of required pictures depends on four factors: 1) the focal length of the camera lens; 2) the width of the film; 3) the height of the film; and 4) the overlapping ratio between contiguous pictures used to register adjacent pictures. Along any view direction, the corresponding perspective view of the spherical panorama should be included in one or more pictures, which are used to build the panorama.

Figure 4:
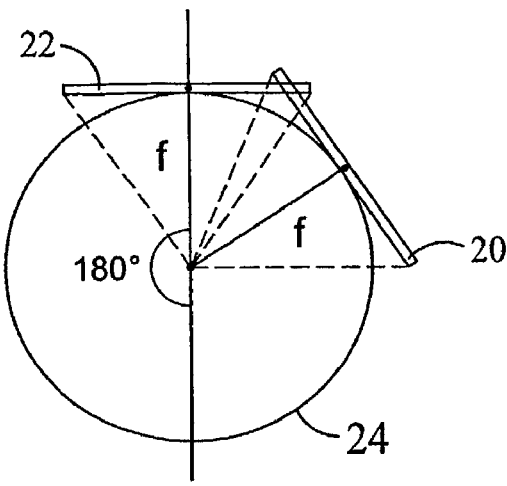
FIG. 4 is a top view of two overlapping pictures taken at different sight directions extending through the equator.

Referring to FIG. 4, two pictures 20, 22 tangent to an imaginary sphere 24 of radius "f" are taken for respective sight directions extending through the equator (i.e., the circle of the equator whose plane is perpendicular to the axis extending through the poles of sphere 24). A portion of a spherical panorama is to be built by pictures photographed with a photographic system 12 (FIG. 3). For example, let the film height be designated as "a", the film width as "b", the focal length as "f", and the overlapping ratio between contiguous pictures as "k (in percent)". In order to cover the entire surface of the sphere, circles of latitude, each including a series of contiguous pictures are required.

The pictures can be taken using either a landscaping or a portrait style picture-taking approach. Theoretically, the number of pictures taken from the two approaches to build a spherical panorama is the same. The number of circles of the landscape style is larger than that of the portrait style, but the number of pictures in one circle of the landscape style is generally smaller than that of the portrait style.

However, in practical implementations, the number of circles is generally restricted to an odd number because the degree to which the elevation is varied with the photographic equipment on the equator is small. Horizontal registration is also used for the pictures of the circle at equator to determine the horizontal relationship between the panoramic pictures. Due to these restrictions, the number of pictures in the landscape style is typically larger than that of the portrait style.

Nevertheless, users can adopt either picture-taking approach depending on their application.

If the pictures are taken based on the style of landscape pictures, the fewest number of circles of latitude, (NumCirclesLandscape) required to be photographed is:

$$NumCirclesLandscape = \left\lceil \frac{180°}{(100-k)\% * \left[2\tan^{-1}\left(\frac{a}{2f}\right)\right]} - 1 \right\rceil.$$

On the other hand, if pictures are taken in the style of a portrait, the least number of circles of latitude (NumberCirclesPortrait) will be $$NumCirclesPortrait = \left\lceil \frac{180° - 2\tan^{-1}\left(\frac{b}{2f}\right) + \left[2k\% * \tan^{-1}\left(\frac{a}{2f}\right)\right]}{(100-k)\% * \left[2\tan^{-1}\left(\frac{a}{2f}\right)\right]} \right\rceil. \quad (5)$$

Based on the number of circles predefined, we can determine the sight direction of each circle below the north pole of the sphere, that is, the value of $\phi$.

The number of pictures, needed to completely cover the zone of each circle of the sphere surface, depends on the sight direction above (or below) the equator. The nearer any pole the sight direction is, the fewer pictures are needed. However, taking the design of the image stitching algorithm into consideration the same number of pictures for each circle are taken along the top and bottom directions. The actual number of pictures required for the circle is determined by the possible width of warped images and the overlapping ratio between contiguous pictures. Standard photographic equipment being imperfect, it is difficult to take pictures with very accurate sight directions. Thus, the narrowest possible width of warped images after cutting is used to derive the number of pictures needed to be taken in a circle of latitude. The narrowest width will appear in the first order derivation of WarpImageWidth($\phi_J$) with $\phi_J$ being equal to zero. The number of pictures taken for a circle of latitude, NumPictures (a, f, k), is represented by:

$$NumPictures(a, f, k) = \left\lceil \frac{360°}{\tan^{-1}\left(\frac{2f}{a}\right) * (100-k)\%} \right\rceil. \quad (6)$$

Assume, for example, that the photographic system has a focal length of 18 mm, and the film has a width of 24 mm, and a height of 36 mm. Assume further that a portrait style picture taking approach is used. Based on Equation 5, in addition to two pictures along two poles, three circles of latitude are required to provide an overlapping ratio of 40%. The view field along the direction of the south pole will be obstructed by the tripod of the camera. It will be substituted by a marked or patterned image. The narrowest width will appear in the $\phi$ being 45° or 135°. Using Equation 6, the number of pictures of one circle of latitude is 12. Thus, for three circles of latitude, 36 pictures plus an additional picture along the direction of the north pole are required to cover the sphere. The 37 pictures will be used to explain the proposed algorithm of image stitching and show the effectiveness of our proposed method in this invention.

In one embodiment, the photographic equipment used to take pictures includes a pan head which controls the rotation angles of the camera around the polar axis. It is desirable to keep errors in rotation angle within five degrees. However, it may be difficult to automatically control the panning above or below the equator resulting in errors larger than five degrees.

Transforming Photographic Images to a Parametric Spherical Environment Map

A parametric spherical environment map (PSEM) is used to store the environment data of a spherical panorama. First, using an "image warping procedure", each picture is transformed into the PSEM based on a sight direction designated as ($\theta_1$, $\phi_1$). These warped images are stitched together as a complete seamless image of the PSEM using image registration. Conventional image processing algorithms represent images with two-dimensional arrays. That is, the shape of most images used in image processing is rectangular. However, on the PSEM, the shapes of warped images of rectangular pictures are not rectangular. The shapes depend on the value of angle φ below the north pole.

Figure 5:
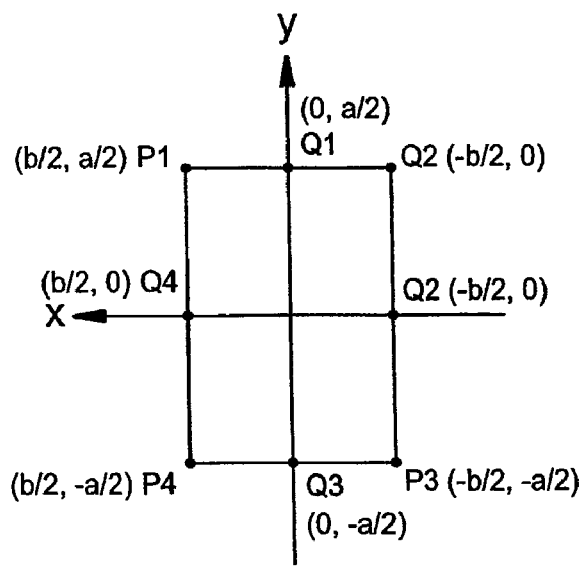
FIG. 5 illustrates a two dimensional coordinate system for the picture of FIG. 3.

For a picture, we can utilize a two dimensional Cartesian coordinate system to describe the viewing plane. Referring to FIG. 5, the origin of the two dimensional Cartesian coordinate system is defined to be at the center point of the picture. The x axis is along the direction of film width (designated as "b") and the y axis is along that of film height (designated as "a"). The coordinates of the four corner points of the picture (P1, P2, P3, and P4) are (b/2, a/2), (−b/2, a/2), (−b/2, −a/2), and (b/2, −a/2); the coordinates of the center points of the four picture bounding edges (Q1, Q2, Q3, and Q4) are (O, a/2), (−b/2, O), (O, −a/2), and (b/2, O), respectively.

Figure 6:
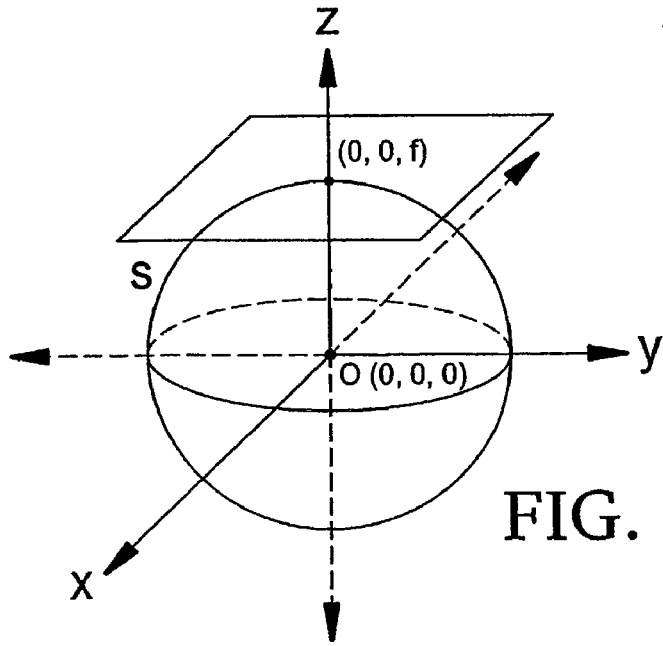
FIG. 6 is a three dimensional coordinate system illustrating the spatial relationship between the film and the lens of a camera.

Referring to FIG. 6, let the spatial relationship between the film and the lens within a camera be described by a three dimensional Cartesian coordinate system. The optical center of the lens of the camera is located at the origin of the three dimensional coordinate system, with the film located along the z-axis at point f. Thus, the coordinates of the four corner points P1, P2, P3, and P4 will be (b/2, a/2, f), (−b/2, a/2, f), (−b/2, −a/2, f) and (b/2, −a/2, f); the coordinates of the four center points Q1, Q2, Q3, and Q4 will be (O, a/2, f), (−b/2, O, f), (O, −a/2, f) and (b/2, O, f), respectively.

Assume that the sight direction of picture i is designated ($\theta_i$, $\phi_i$). With horizontal cutting, the width of the rectangular image after cutting—WarpImageWidth, is equal to the width of PSEM—WidthpSEM, and is obtained as follows:

$$\text{Width}_{PSEM} = 360° * \text{x\_resolution\_}PSEM \qquad (7)$$

The image height, independent of $\theta_1$, is computed from the coordinates of point Q2 (−b/2, O, f) and point Q3 (O, −a/2, f). Thus, the sole cutting line is determined based on the minimum y-coordinate of point Q2 and point Q3. The y coordinate of Q2 in PSEM is calculated as follows:

$$y_m(\phi_i, Q2) = \text{y\_resolution\_PSEM} * \cos^{-1}\left[\frac{2f\cos\phi_i}{(b^2+4f^2)^{1/2}}\right], \qquad (8)$$

and the y coordinate of Q3 in PSEM is calculated as follows:

$$y_m(\phi_i, Q3) = \text{y\_resolution\_PSEM} * \cos^{-1}\left[\frac{-a\sin\phi_i + 2f\cos\phi_i}{(a^2+4f^2)^{1/2}}\right], \qquad (9)$$

where $\phi_1$ is the angle of picture i's sight direction below the north pole of the sphere. Therefore, the sole cutting line for performing horizontal cutting is $$y = \text{y\_resolution\_PSEM} * \min(y_m(\phi_i, Q2), y_m(\phi_i, Q3)) \qquad (10)$$

$$= \text{y\_resolution\_PSEM} *$$

$$\min\left(\cos^{-1}\left[\frac{2f\cos\phi_i}{(b^2+4f^2)^{1/2}}\right], \cos^{-1}\left[\frac{-a\sin\phi_i + 2f\cos\phi_i}{(a^2+4f^2)^{1/2}}\right]\right).$$

Figure 8A:
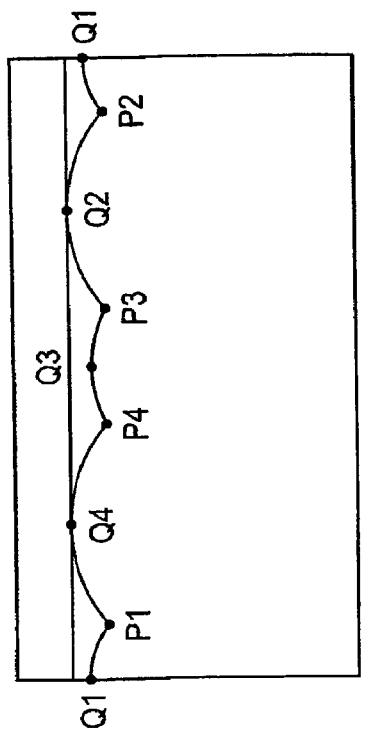
FIGS. 8A and 8B illustrate the concept of horizontal and vertical cutting, respectively.
Figure 8B:
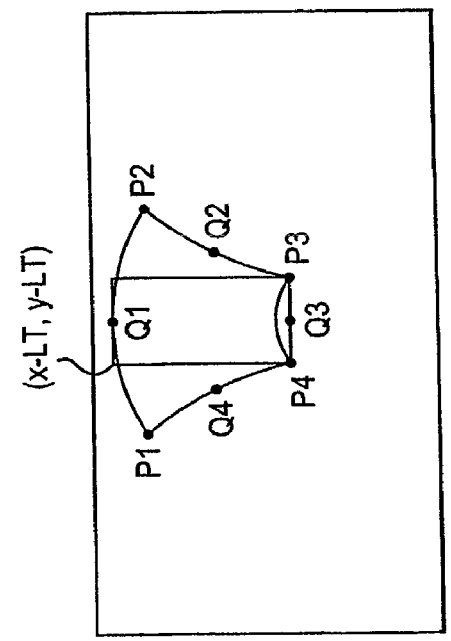

As for vertical cutting, the two opposing horizontal lines and the two opposing vertical lines can also be derived from the coordinates of point Q1 (O, a/2, f), point Q3 (O, −a/2, f), point P3 (−b/2, −a/2, f), and point P4 (b/2, −a/2, f), respectively (see FIG. 8B). Similarly, the sight direction of picture j is designated as ($\theta_j$, $\phi_j$). The equations of the two vertical lines are x=$x_m$($\theta_j$, $\phi_j$, P3), and x=$x_m$($\theta_j$, $\phi_j$, P4), respectively. And, the x coordinate of P3 in the PSEM is $$x_m(\theta_j, \phi_j, P3) = \qquad (11)$$
$$\text{x\_resolution\_PSEM} * \left[\theta_j + \tan^{-1}\left(\frac{-b}{a\cos\phi_j + 2f\sin\phi_j}\right)\right],$$

and the x coordinate of P4 in PSEM is $$x_m(\theta_j, \phi_j, P4) = \qquad (12)$$
$$\text{x\_resolution\_PSEM} * \left[\theta_j + \tan^{-1}\left(\frac{b}{a\cos\phi_j + 2f\sin\phi_j}\right)\right],$$

where the angle of the picture j's sight direction is $\phi_j$ below the north pole of the sphere.

The equations of the two horizontal lines, independent of $\theta_j$, are y=$y_m$($\phi_j$, Q1) and y=$y_m$($\phi_j$, Q3), respectively. The y coordinate of Q1 in the PSEM is $$y_m(\phi_j, Q1) = \text{y\_resolution\_PSEM} * \cos^{-1}\left[\frac{a\sin\phi_j + 2f\cos\phi_j}{(a^2+4f^2)^{1/2}}\right]. \qquad (13)$$

and the y coordinate of Q3 in the PSEM, $y_m$(($\phi_j$, Q3)) can be computed using Equation 9.

For picture j, the coordinates (x_LT, y_LT) of the left-top corner point of the rectangular image is then equal to ($x_m$($\theta_j$, $\phi_j$, P4), $y_m$($\theta_j$, $\phi_j$, Q1) to ($x_m$($\theta_j$, $\phi_j$, P4), $y_m$($\theta_j$, $\phi_j$, Q1)).

Referring to FIGS. 7A-7E, five warped images having different shapes are shown, each of which is transformed from a rectangular picture of a photographic image and based on five different sight directions, respectively. For the five directions, the angle θ around the equator is set to 180°, but angle φ below the north pole is set to five different values:

φ=0°, φ=30°, φ=45°, φ=60°, and φ=90°.

The image stitching algorithm will now be discussed.

Image warping to generate the PSEM from photographic images includes two kinds of functions: "image warping transformation" and "image cutting". The warped images with irregular shapes are cut into rectangular shapes to be used later during the stitching processing. As illustrated by FIGS. 7A-7E, the shapes of warped images on the PSEM depend on the φ values below the north pole of the sphere. The nearer to any pole of a sphere the sight direction is, the wider the warped image is. Thus, the manner of cutting images depends on the shape of a warped image which, in turn, depends on the value of φ in the sight direction.

In one embodiment, for example, a camera system having a focal length of 18 mm, a film width of 24 mm, and a film height of 36 mm is used to provide photographs for building a spherical panorama. Referring to FIGS. 8A and 8B, the rules of image cutting for such a camera system can be established as follows:

If φ is less than 10° or not greater than 170°, the warped image is cut into a rectangular region by one horizontal line (FIG. 8A). This manner of cutting is called horizontal cutting.

If φ is between 30° and 150°, the image region is cut into a rectangular region by four lines (FIG. 8B). The coordinates of the left-top corner point of the rectangular is designated as (x_LT, y_LT). This manner of image cutting is called vertical cutting.

If φ is between 10° and 30° or φ between 150° and 170°, the type of image cutting is determined based on the requirements of the particular.

Figure 9:
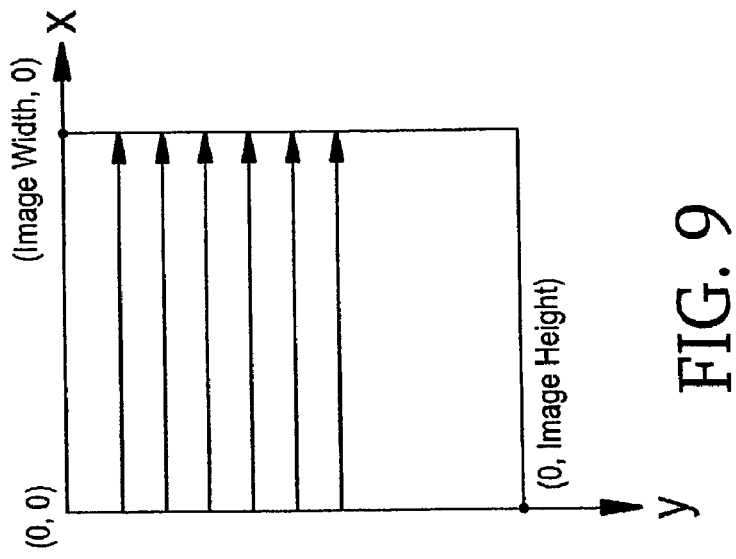
FIG. 9 shows a two-dimensional coordinate system for representing pixels of an image stored in a memory.

Referring to FIG. 9, to represent an image using a two-dimensional array, a two-dimensional coordinate system is defined in which the left-top corner of the image is located on the original, the positive x direction is to the right, and the positive y direction extends downward. The x and y coordinates of a pixel indicate the serial ranks of the pixel from left to right and from top to bottom, respectively. During image processing, all pixels of a two-dimensional image are loaded into a one dimensional memory array from a disk file or CD-ROM. Each pixel address in the memory array is denoted by a variable, here called Offset, which is defined and calculated based on the x and y coordinates of the pixel as follows:

$$\text{Offset} = k*(y*\text{ImageWidth} + x) \quad (14)$$

where ImageWidth is the number of pixels in each row of the image; and k is the number of bytes used to represent each pixel.

For horizontal cutting, the width of the rectangular image after cutting, called "WarpImageWidth", is equal to the width of the PSEM—Width and can be calculated using Equation 7 above.

The image height after horizontal cutting, called WarpimageHeight can be determined using the following relationship:

$$WarpImageHeight(\phi_I) = \qquad (15)$$
$$y \text{ resolution } PSEM * \min\left(\cos^{-1}\left[\frac{2f\cos\phi_I}{(b^2+4f^2)^{1/2}}\right], \cos^{-1}\frac{-a\sin\phi_I+}{(a^2+4}\right)$$

As for vertical cutting, the width of a rectangular image after a vertical cutting is computed as follows:

$$WarpImageWidth(\phi_J) = 2\tan^{-1}\left(\frac{b}{a\cos\phi_I + 2f\sin\phi_I}\right). \qquad (16)$$

The height of a rectangular image after a vertical cutting, WarpImageHeight, is then computed as follows:

$$WarpImageHeight(\phi_I) = \qquad (17)$$
$$y \text{ resolution } PSEM * \cos^{-1}\left[\frac{-a\sin\phi_I + 2f\cos\phi_I}{(a^2+4f^2)^{1/2}}\right] - \cos^{-1}\left[\frac{a\sin\phi}{a^2}\right]$$

For each warped image, instead of storing the entire PSEM, only the rectangular image after cutting is required to be stored and processed during image stitching. When the rectangular image is represented by a two-dimensional array, these image pixels are described using the coordinate system described above in conjunction with FIG. 9. The coordinates of the left-top corner point (x_LT, y_LT) are designated as (0, 0) in the new system. As for coordinate transformation, the rectangular image is translated to the left-top of the PSEM. Then, the PSEM is cut into the same size as the rectangular image. The image remaining after cutting will be used and processed during image stitching, and is stored into a memory array.

In the PSEM space, "translation" along lines of latitude of the sphere (i.e., the equatorial direction) corresponds to "rotation" around the axis extending through the two poles of the sphere. Therefore, the angle of the sight direction around the horizon $\theta_L$, used for image warping, can be represented by the following equation:

$$\Theta_L = -\tan^{-1}\left(\frac{b}{a\cos\phi_J + 2f\sin\phi_I}\right). \qquad (18)$$

The original y coordinate of a pixel in the PSEM is equal to the y coordinate in the new coordinate system plus y_LT. The y_LT variable is then designated as φ_TranslatePixels.

In one implementation, the width and height of the rectangular warped image after cutting is first calculated based on sight direction. The information of the image size will be useful in the image warping procedure described below. This procedure is described using a C-like programming language. The source code listing is included in Appendix I. Other similar programming languages may be used to implement the image warping procedure.

The program includes input and output arguments both of which are listed at the start of the source code listing. In the following image warping procedure, the input arguments include the focal length designated as "f", the film width as "FilmWidth", the film height as "FilmHeight" and the memory storing the picture imaged designated as "PictureImage". The width and height of the picture image to be processed is designated as "PictureImageWidth" and "PictureImageHeight", respectively, and the width and height of the warped image on the PSEM after image cutting is designated as "WarpImageWidth" and "WarpImageHeight", respectively. The resolutions of the axes of the PSEM are designated as "x_resolution_PSEM" and "y_resolution_PSEM", respectively. The sight direction of the picture below the north pole is designated as $\phi_L$ and the number of pixels translated for storing the cut image is designated as "φ_TranslatePixels". The sole output argument is the memory storing the warped image, which is designated as "WarpImaqe".

Each pixel in the warped image is mapped from at least one pixel in the photographic image. The attributes (e.g., color) of each pixel in the warped image are derived from as those of a corresponding pixel in the photographic image. Thus, for each pixel in the warped image, the memory address of the photographic pixel from the corresponding pixel of the warped image needs to be derived. In the description of the procedure, the x and y coordinates of each pixel in the warped image after cutting are designated as "x_index" and "y_index"; the image width and image height of the photographic image are designated as "m" and "n"; the address of the memory storing the photographic image is designated as "OffsetPictureImage"; and the address of the memory storing the warped image designated as "OffsetWarpImage".

Image Stitching a Spherical Panorama

Building a spherical panorama using image stitching includes three important stages: 1) computing accurate sight directions of the pictures used to build the panorama; 2) adjusting the intensity of the picture images; and 3) stitch processing. Based on the predefined picture-taking approach discussed above, a set of pictures to be overlapped are taken with a conventional camera. The number of pictures when overlapped are sufficient for building a spherical panorama. An image stitching approach (described below) is then used to stitch the photographic images shown in the pictures together into a complete image of the spherical panorama.

The first and most important stage in stitching these overlapping photographic images, is to compute accurate sight direction of each picture. The sight directions of the pictures are needed to determine whether the photographic images can be stitched together or not. Although, as discussed above, each picture is taken based on a predefined sight direction, errors in sight direction due to imperfect photographic equipment and the setup of the equipment may still exist. Therefore, the image stitching approach performs image registration in both the horizontal (latitudinal) and vertical (longitudinal) directions of the PSEM to compute accurate sight directions of each picture.

Figure 10:
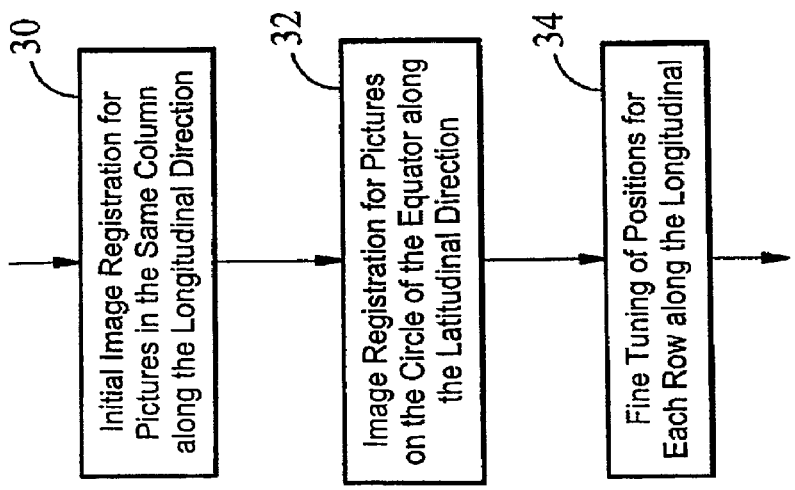
FIG. 10 is a flowchart showing the steps for computing accurate sight directions for the pictures used to build a spherical panorama.

Referring to FIG. 10, a flow diagram shows the steps required for computing accurate sight directions for the pictures. The process also contains three steps: 1) vertical (or longitudinal) image registration (30); 2) horizontal (or latitudinal) image registration (32); and 3) fine tuning of the pictures' sight direction along longitudinal directions (34). In addition to taking the same number of pictures of each circle of latitude, a picture is also taken along the zenith direction. The spatial relationships of these pictures can be described with a two-dimensional array of rows and columns. The pictures taken in each row are taken at the same latitudinal angle, and the pictures of each column are taken at the same longitudinal angle. To obtain a seamless image of a spherical panorama, images are registered in each row and each column. Thus, both horizontal image registration and vertical image registration is required.

A semi-automatic approach accomplishes the required image registration. A correlation-based algorithm as described in U.S. Ser. No. 08/933,758 is used to initially register the contiguous images. However, inconsistent intensities in images may result in registration errors. Thus, a software tool having a convenient graphic user interface (GUI) is used to inspect the registration results and correct any existing errors. The tool can be used to display an array of warping images on a screen based on the positions obtained from image registration. Overlapping regions of two adjacent images can be seen on the screen, Thus, the result of the image registration can be inspected by the software. If the result is not perfect, users can move the warping images (e.g., with a mouse) to obtain better registration. Before performing image registration, all of the pictures to be registered are transformed onto the space of a PSEM.

Figure 11:
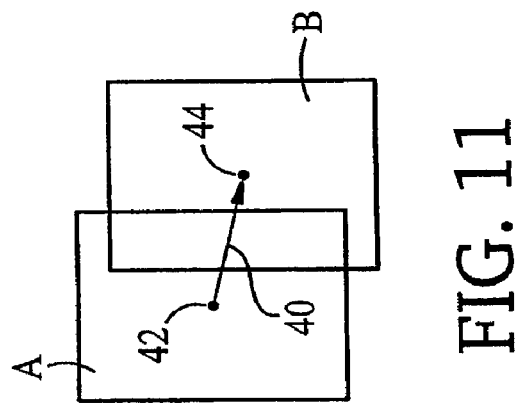
FIG. 11 shows the offset between two contiguous images after registration.

Referring to FIG. 11, assume that an image A and an image B are two warped images provided through image cutting and have already been registered. A vector from the center 42 of image A to the center of image B, is designated as $(\Delta X_{BA}, \Delta Y_{BA})$. The difference in their sight directions, $(\Delta \theta_{BA}, \Delta \phi_{BA})$, can be obtained as follows:

$$\Delta \theta_{BA} = \frac{\Delta x_{BA}}{x\_resolution\_PSEM} \quad (19)$$

$$\left\{ \Delta \varphi_{BA} = \frac{\Delta y_{BA}}{y\_resolution\_PSEM} \right.$$

As discussed above, precisely controlling the level of the camera used to take the pictures during panning of the camera is difficult. Thus, derivations in panning above and below the equator of the sphere can result in significant errors. Basically, with a correlation-based algorithm, image registration is accomplished by computing the image phase correlation for all of the possible positions of image alignment and selecting the one resulting in a minimum alignment difference. Searching for the best alignment position (x, y) in a two-dimensional image array is accomplished through a series of translations along x and y directions.

PSEM has the characteristic of "translation" along the equatorial direction in the map corresponding to "rotation" around the axis of two poles of a sphere. The warped image of a particular picture can be obtained from another warped image of the same picture with the same angle below the north pole but with different θ around the latitudinal direction. However, warped image with different φ's should be recomputed for different φ's. Thus, another new coordinate system is used to transpose a vertical image registration in the original coordinate system to a horizontal image registration in the new coordinate system. The difference of sight directions around the polar axis in the new coordinate system corresponds to that along the longitudinal direction in the original coordinate system. The time required for vertical registration can be dramatically sped up, particularly for those with large differences in φ, by eliminating the recomputation of warped images for different φ's.

Figure 12:
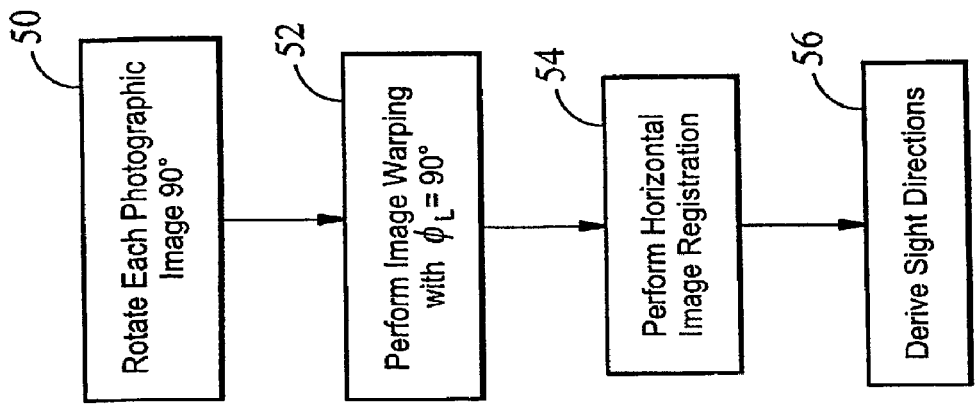
FIG. 12 is a flowchart showing the steps for an approach for performing vertical registration.

Referring to FIG. 12, to compute accurate sight directions of pictures, a vertical image registration in the original coordinate system can be performed based on the following four steps:

1. Rotate each photographic image 90° clockwise (step 50). This rotation can be accomplished by storing one row of image pixels into a column of another image array indexed in the inverse sequence.
2. Apply the "image warping procedure" described above to the rotated image setting the $\phi_L$ set to 90° (step 52).
3. Apply the horizontal image registration to them (step 54). The pictures arranged from left to right are in the order of decreasing φ's.
4. Derive accurate sight directions from the image positions of image registration (step 56).

Assume that the sight direction of one picture on the equator is designated as $(\theta_e, \phi_e)$, and that of a contiguous picture with the same longitudinal angle above the equator is designated as $(\theta_a, \phi_a)$. Through a coordinate transformation and a horizontal image registration, the difference of sight directions in the new coordinate system, denoted by $(\Delta \theta_{(n)}, \Delta \phi^{(n)})$, can be obtained. The sight direction of the picture above the equator in the original coordinate system can be derived as follows:

$$\theta_a = \theta_e - \Delta \varphi^{(n)} \quad (20)$$

$$\{ \varphi_a = \varphi_e - \Delta \theta^{(n)}$$

The sight directions of the pictures in other circles can also be calculated and derived in similar manner.

Figure 13:
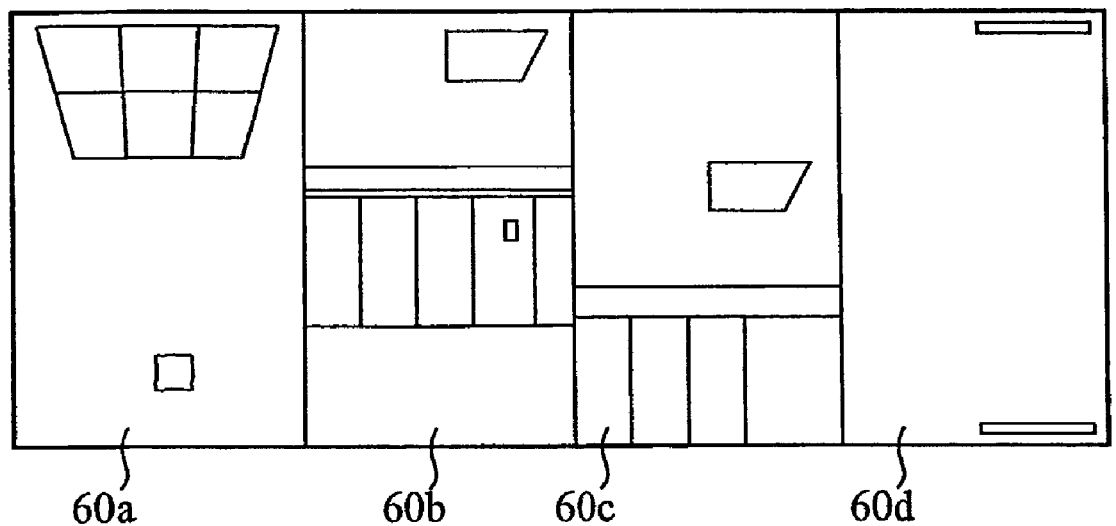
FIG. 13 shows a series of four pictures of a scene taken at different elevation angles.

FIG. 13 shows, from left to right, pictures taken of a scene in which the elevation angle of the camera has been changed. In particular, pictures 60a-60c were photographed below, at, and above the equator, respectively. Picture 60d is taken in the zenithal direction. The respective predefined θ's of these pictures have errors within five degrees. However, the possible errors of φ's may be much greater. The four pictures are to be registered along the longitudinal direction.

Figure 14:
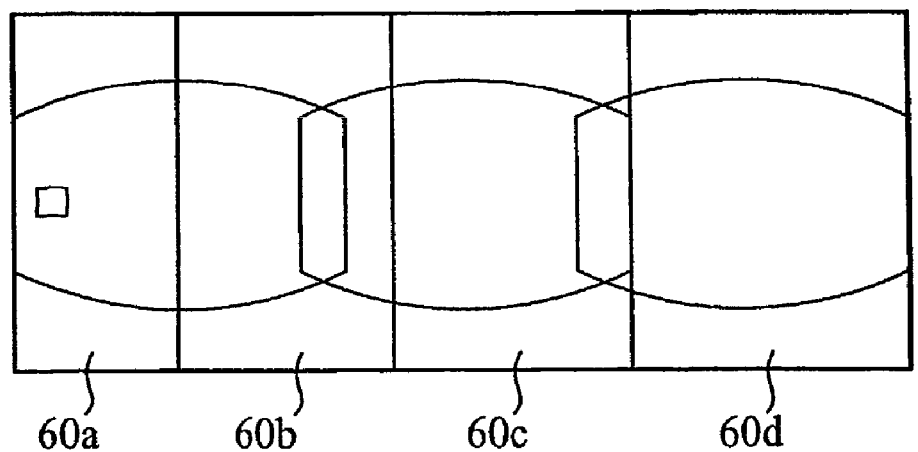
FIG. 14 illustrates the four pictures of FIG. 13 after image warping and registration.

Referring to FIG. 14, the horizontal image registration of pictures 60a-60d through the coordinate transformation procedure described above is shown.

Following coordinate transformation, the spatial relationships between contiguous pictures around the equatorial direction is determined. To accomplish this task for computing accurate sight directions of pictures, the horizontal (or latitudinal) image registration on the pictures of the circle is performed on the equator because the variance of pictures's sight directions in $\phi$ is smaller than that of other circles of latitude. Following horizontal image registration, accurate sight directions of all the pictures on the equator $(\theta_e, \phi_e)$'s are obtained. The sight directions of respective pictures in other circles of latitude can also be indirectly derived similarly as discussed above.

As described above, normal registration is divided into the horizontal registration and the vertical registration. Both registration steps process one dimensional arrays of images. Therefore, only two adjacent images are compared during the normal image registration. After performing two-directional image registration, a software tool is used to inspect registration of the stitched images. The stitched image of the equatorial circle should be seamless because the horizontal image registration is applied to the pictures on the circle. However, seams may exist between certain ones of the contiguous images of other circles along the equatorial (or latitudinal) direction because the spatial relationships are indirectly derived from the positions of pictures on the equator. If seams exist, fine tuning for picture positions of other circles along the longitudinal direction should be performed to eliminate the seams in the stitched image. Fine tuning can be accomplished automatically using a software tool for image registration or performing manual fine tuning. Fine-tuning of image registration is performed to obtain better stitching of a two dimensional image array. Each column of images is processed by the vertical registration, and only the row of images at the equator is processed by the horizontal registration. The positions of images in the other rows are derived indirectly. In particular, the images of the other rows are processed using horizontal registration. For horizontal registration of the other rows of images, both the horizontal and vertical relationships can be tuned, but the horizontal relationship can only be modified a little. This type of horizontal registration is called "fine-tuning." The final sight directions of all pictures after this fine tuning procedure are recorded for the latter stage of stitch processing.

The brightness of all pictures to be seamed together should be tuned to an average brightness (or intensity) value. Because the shutter of a camera opens in different degrees, and each picture is taken at a different instance in time, the brightness (or intensity) of contiguous pictures may differ greatly. It is a necessary that in building a panoramic image, the brightness of the contiguous pictures be smoothed.

Figure 15A:
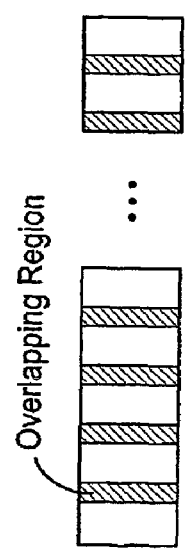
FIGS. 15A and 15B illustrate the concept of image stitching in accordance with the invention.
Figure 15B:
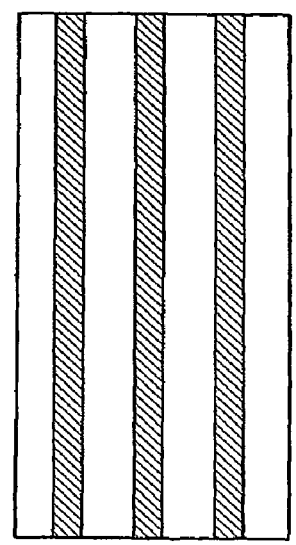

Referring to FIGS. 15A and 15B, in the example of the invention, only the two pictures along the two poles are processed using horizontal cutting while the others are all processed by the vertical cutting. During stitch processing, based on computed accurate sight directions, the warped images provided by vertical cutting in one circle of latitude are first seamed together from left to right as a flat rectangular image (FIG. 15A). In this example, the picture along the south pole is replaced by a rectangular marked or patterned image because the view field is hidden by the camera tripod. Therefore, including the picture along the north pole, there are four such flat rectangular images to be seamed together via image processing techniques. The position of each flat rectangular image in the PSEM can be acquired from the sight directions of pictures. Therefore, based on one sequence from top to bottom or an inverse sequence, the four flat images can be seamed together, as shown in FIG. 15B.

During stitch processing, discontinuities of image intensity may exist between two contiguous images even though the intensities of these pictures were adjusted. Therefore, for an overlapping image region between two images, image blending should be applied to the overlapping region to smooth the discontinuities between two images.

Figure 16A:
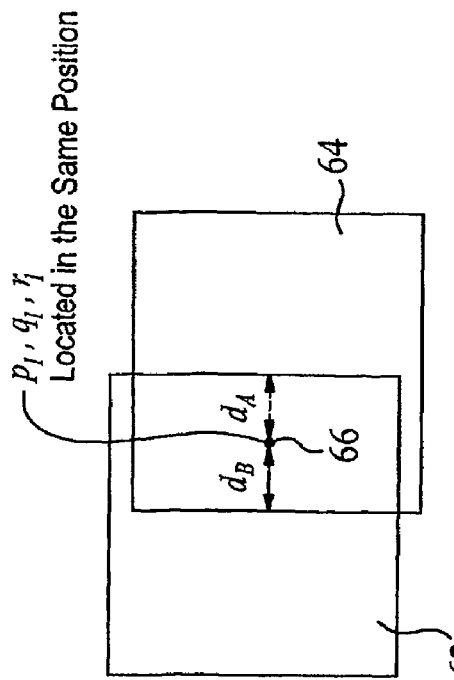
FIGS. 16A and 16B illustrate the concept of image stitching in accordance with the invention.
Figure 16B:
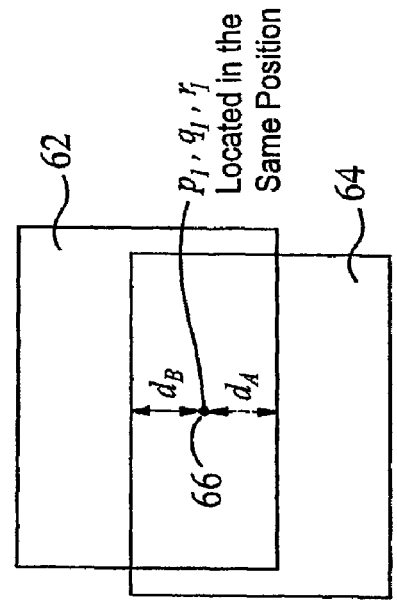

Referring to FIGS. 16A and 16B, the spatial relationship between two images to be stitched together can be from left to right or from top to bottom. For example, assume that two images 62, 64 are to be stitched together. A pixel 66 of image 62, located in the overlapping region, is denoted by $P_i$, and the pixel of image 64, located in the same position of pixel 66 in the stitched image, is denoted by $q_1$. The corresponding pixel in the stitched image is designated as $r_1$. To achieve image blending, the intensity of pixel $r_1$ is calculated from the intensity of $p_1$ and $q_i$ as well as the two distances from the pixel position to respective boundaries as follows:

$$I(r_1) = \frac{d_A^t \cdot I(p_1) + d_B^t \cdot I(q_1)}{d_A^t + d_B^t}$$

where $d_A$ is the distance between pi and boundary of image 62; $d_B$ is the distance between $q_i$ and boundary of image 64; t is a power factor. Image blending is observed visually with power factor t adjusted empirically to provide the optimum blending (e.g., set to 3) (See U.S. Ser. No. 08/933,758 for further details relating to determining power factor t).

During stitch processing, it may be necessary to perform additional image processing to obtain a continuous stitched image between the left-most and the right-most boundaries.

Figure 17:
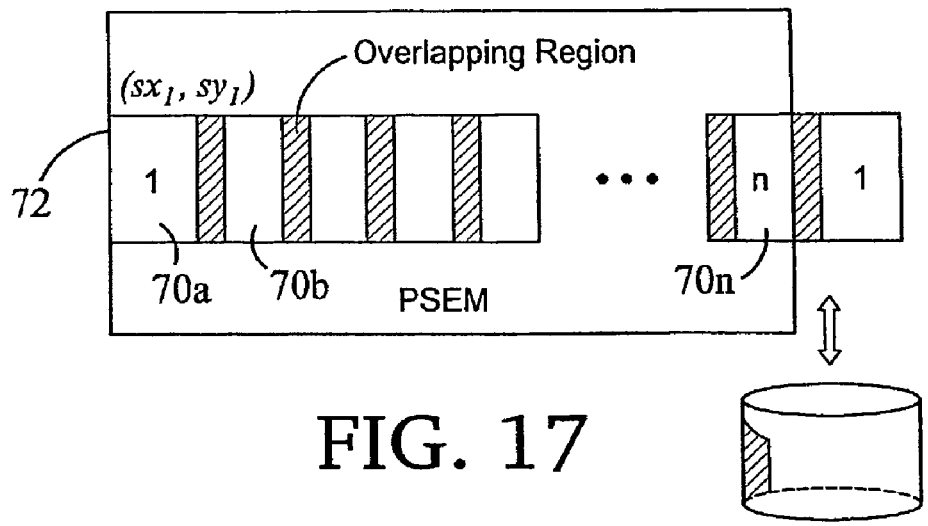
FIG. 17 shows the concept of registering and blending a contiguous stitched image.

Referring to FIG. 17, when warped images 70a-70n in circle of latitude are to be seamed into a flat rectangular image from left to right using vertical cutting, the coordinates of the left-top corner 72 of the left-most image 70a in the circle of latitude is designated as $(sx_1, sy_1)$. The warped images 70a-70n of the pictures in the circle are to be stitched together, one-by-one, based on the sight directions computed by image registration. Finally, by placing the left-most image 70a in the right side of the right-most image 70n, the two images are registered and blended to obtain a contiguous stitched image through 360° panning.

Assume that the coordinates of the left-top corner of the left-most image, being placed to the right side of the right-most image, is $sx'_1$, $sy'_1$ after image registration. Ideally, the width of the stitched image, being equal to the difference between $sx_1$ and $sx'_1$, should be the same as the width of the PSEM. Moreover, it would be ideal if the y coordinate $sy_1$ was the same as $sy'_1$ so that the stitched image would not slant.

However, in practical situations, the photographic equipment used to take the pictures is imperfect and the nodal point of the camera lens cannot be kept absolutely stationary for all of the pictures.

A stitched image may be wider or more narrow than a PSEM within which the stitched image is mapped. In order to utilize the PSEM to store the stitched image, modifications are required so that the image width is equal to that of the PSEM. It may be necessary for columns of pixels to be eliminated or inserted in open space to reduce or increase the image width, respectively.

Figure 18A:
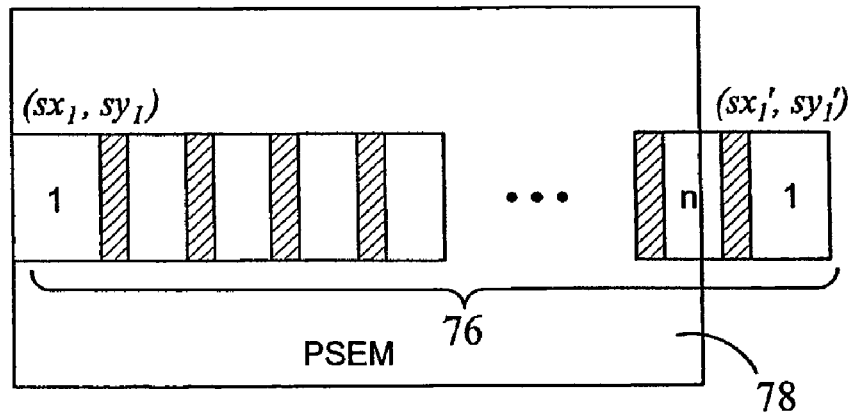
FIGS. 18A and 18B shows stitched images which are wider and narrow than the spherical environmental map within which the stitched images are mapped.
Figure 18B:
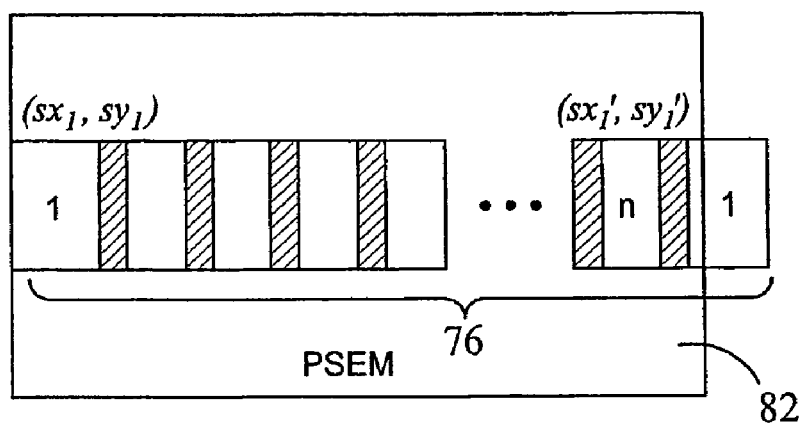

Referring to FIG. 18A, for example, if a stitched image 76 is wider than a PSEM 78, one column of pixels will be eliminated for every d columns. On the other hand, as shown in FIG. 18B, if a stitched image 80 is narrower than a PSEM 82, one column of pixels should be repeatedly stored for every d columns. For example, let the difference between the two widths be designated as Δx (=sx'$_1$−WidthpSEM). The space d between two columns of pixels to be modified is defined as:

$$d = \left[\frac{\Delta x + WidthPSEM}{\Delta x}\right] = \left[\frac{sx_1}{\Delta x}\right] \quad (22)$$

Figure 19:
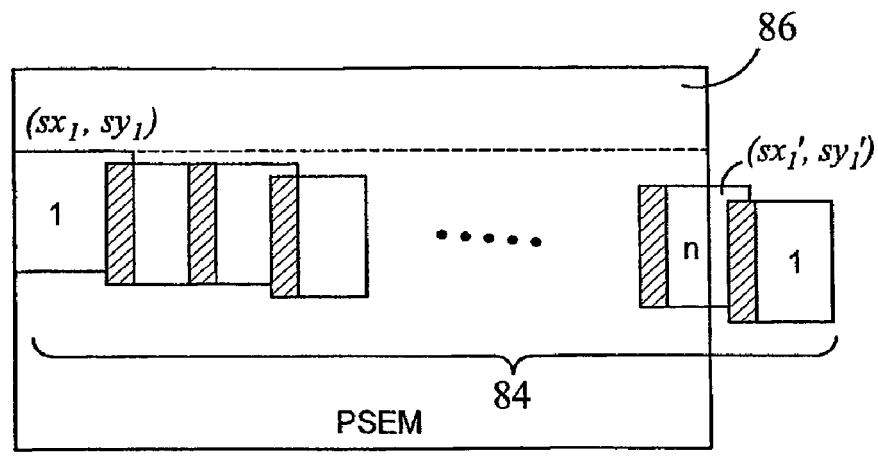
FIG. 19 shows a stitched image having discontinuities between two picture boundaries which are caused by tilting or slanting of the camera system used to take the pictures.

Referring to FIG. 19, a stitched image 84 may also slant to one side due to, for example, the camera being mounted on the equipment in a tilted manner (i.e., not vertical). Thus, the y coordinate sy$_1$ is not the same as sy'$_1$. Thus, images on the left-most and the right-most boundaries are not contiguous.

In this circumstance, it is necessary to modify stitched image 84 such that the discontinuities on the boundaries of the stitched image are eliminated. To do so, the difference between y coordinates (sy'$_1$−sy$_1$) are used to determine how stitched image 84 is to be modified. The number of pictures in a circle of latitude is designated as NumPictures previously. If the absolute value of the difference (sy'$_1$−sy$_1$) is less than NumPictures, the y positions of a series of images are modified by equally increasing or decreasing y coordinates so that the y coordinate sy'$_1$ after the modification will be equal to sy$_1$ and stitched image 84 will be not slanted again.

On the other hand, if the absolute value of the difference (sy'$_1$−sy$_1$) is greater than or equal to NumPictures, the image discontinuities cannot be eliminated using the above modification method. Therefore, an image rotation, a more time consuming process, is applied to slant the stitched image. The rotation angle α is represented by:

$$\alpha = \tan^{-1}\frac{-(sy_{1'} - sy_1)}{WidthPSEM} \quad (23)$$

Additional buffer is used to store the stitched image after the rotation. The new coordinates after rotation (x', y') can be computed from the old coordinates as follows:

$$\begin{cases} x' = sx_1 + (x - sx_1)\cos\alpha - (y - sy_1)\sin\alpha \\ y' = sy_1 + (x - sx_1)\sin\alpha + (y - sy_1)\cos\alpha \end{cases} \quad (24)$$

After the image rotation, the images in the right and the left boundaries of the stitched image will be continuous. The process of modifying the width of the stitched image is further applied to the rotated image if necessary.

EXPERIMENTAL RESULTS

Figure 20:
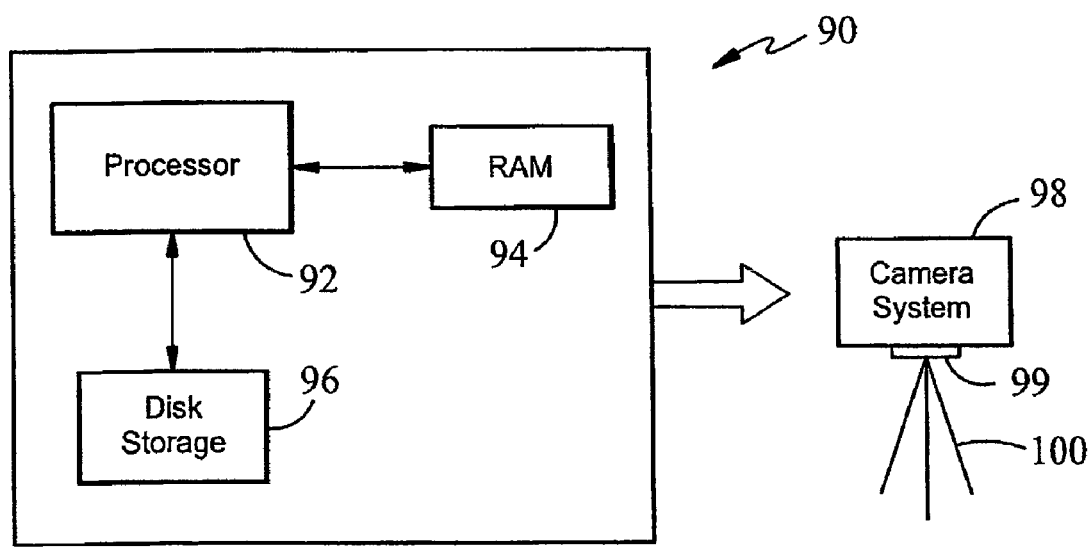
FIG. 20 shows a computer system which is suitable for use with the invention.

For verifying the effectiveness of our proposed method, two experiments were conducted. Referring to FIG. 20, a system 90 for building a spherical panorama including transforming photographic images of a panoramic scene into a spherical environment map and stitching together a two dimensional array of the photographic images is shown. System 90 includes a processor 92 (e.g., Pentium cpu), RAM memory 94 (e.g., 32 MB), and a disk storage 96 (e.g., at least 30 MB) for storing the software tool described above. System 90 is connected to a camera system 98 having a lens with a focal length of 18 mm. Camera system 98 includes a pan head 99 mounted to a tripod 100. Pan head 99 provides 6 degrees of freedom. In the experiments, the width of each sheet of film was 24 mm, the height of each sheet was 36 mm, the focal length of the camera lens was 18 mm, and the overlapping ratio between contiguous pictures was 40%. The number of pictures needed to be taken for building a spherical panorama was determined to be 38. The bottom picture, that is, the picture along the direction of the south pole, was replaced by a marked pattern because the view field along the direction of the south pole was hidden by the camera tripod.

Other embodiments are within the scope of the claims.

What is claimed is:

1. A method comprising:
   determining a number of circles of latitude on the basis of a focal length of a camera system, a dimension of pictures associated with the camera system, and an overlapping ratio between contiguous ones of the pictures;
   receiving a plurality of contiguous pictures associated with each circle of latitude; and
   building, with one or more processors, a spherical panorama from the plurality of contiguous pictures, wherein determining the number of circles of latitude is performed in accordance with the following equation:

$$NumCircles = \left[\frac{180°}{(100-k)\% * \left[2\tan^{-1}\left(\frac{a}{2f}\right)\right]} - 1\right]$$

where:
   a is a height of the pictures associated with the camera system;
   f is the focal length of the camera system; and
   k is the overlapping ratio between contiguous pictures.

2. The method of claim 1, wherein the number of circles of latitude is odd.

3. The method of claim 1, further comprising determining a number of the plurality of contiguous pictures associated with each circle of latitude.

4. The method of claim 3, wherein determining the number of the plurality of contiguous pictures associated with each circle of latitude is based on the following:

$$NumPictures(a, f, k) = \left[\frac{360°}{\tan^{-1}\left(\frac{2f}{a}\right) * (100-k)\%}\right].$$

5. The method of claim 1, wherein the receiving a plurality of contiguous pictures associated with each circle of latitude comprises receiving a plurality of contiguous pictures with a panning error that is about five degrees or less.

6. The method of claim 1, wherein the overlapping ratio is about 40%.

7. A non-transitory computer readable medium having computer instructions stored thereon that when executed perform a method comprising:
   determining a number of circles of latitude on the basis of a focal length of a camera system, a dimension of pictures associated with the camera system, and an overlapping ratio between contiguous ones of the pictures;
   receiving a plurality of contiguous pictures associated with each circle of latitude; and
   building a spherical panorama from the plurality of contiguous pictures, wherein determining the number of circles of latitude is performed in accordance with the following equation:

$$NumCircles = \left\lceil \frac{180° - 2\tan^{-1}\left(\frac{b}{2f}\right) + \left[2k\% * \tan^{-1}\left(\frac{a}{2f}\right)\right]}{(100-k)\% * \left[2\tan^{-1}\left(\frac{a}{2f}\right)\right]} \right\rceil$$

where:
- a is a height of the pictures associated with the camera system;
- b is a width of the pictures associated with the camera system;
- f is the focal length of the camera system; and
- k is the overlapping ratio between contiguous pictures.

8. The computer readable medium of claim 7, wherein the number of circles of latitude is odd.

9. The computer readable medium of claim 7, further comprising computer instructions that when executed perform:
  determining a number of the plurality of contiguous pictures associated with each circle of latitude.

10. The computer readable medium of claim 9, wherein determining the number of the plurality of contiguous pictures associated with each circle of latitude is based on the following:

$$NumPictures(a, f, k) = \left\lceil \frac{360°}{\tan^{-1}\left(\frac{2f}{a}\right) * (100-k)\%} \right\rceil .$$

11. The computer readable medium of claim 7, wherein the receiving a plurality of contiguous pictures associated with each circle of latitude comprises receiving a plurality of contiguous pictures with a panning error that is about five degrees or less.

12. The computer readable medium of claim 7, wherein the overlapping ratio is about 40%.

13. A system comprising:
  means for determining a number of circles of latitude on the basis of a focal length of a camera system, a dimension of pictures associated with the camera system, and an overlapping ratio between contiguous ones of the pictures;
  means for receiving a plurality of contiguous pictures associated with each circle of latitude;
  means for building a spherical panorama from the plurality of contiguous pictures; and
  means for determining a number of the plurality of contiguous pictures associated with each circle of latitude, wherein determining the number of the plurality of contiguous pictures associated with each circle of latitude is based on the following:

$$NumPictures(a, f, k) = \left\lceil \frac{360°}{\tan^{-1}\left(\frac{2f}{a}\right) * (100-k)\%} \right\rceil .$$

14. The system of claim 13, wherein determining the number of circles of latitude comprises determining the number of circles of latitude based on a height of the pictures associated with the camera system.

15. The system of claim 13, wherein determining the number of circles of latitude is performed in accordance with the following equation:

$$NumCircles = \left\lceil \frac{180°}{(100-k)\% * \left[2\tan^{-1}\left(\frac{a}{2f}\right)\right]} - 1 \right\rceil$$

where:
- a is a height of the pictures associated with the camera system;
- f is the focal length of the camera system; and
- k is the overlapping ratio between contiguous pictures.

16. The system of claim 13, wherein determining the number of circles of latitude comprises determining the number of circles of latitude based on a width of the pictures associated with the camera system.

17. The system of claim 13, wherein determining the number of circles of latitude is performed in accordance with the following equation:

$$NumCircles = \left\lceil \frac{180° - 2\tan^{-1}\left(\frac{b}{2f}\right) + \left[2k\% * \tan^{-1}\left(\frac{a}{2f}\right)\right]}{(100-k)\% * \left[2\tan^{-1}\left(\frac{a}{2f}\right)\right]} \right\rceil$$

where:
- a is a height of the pictures associated with the camera system;
- b is a width of the pictures associated with the camera system;
- f is the focal length of the camera system; and
- k is the overlapping ratio between contiguous pictures.

18. The system of claim 13, wherein the number of circles of latitude is odd.

19. The system of claim 13, wherein the receiving a plurality of contiguous pictures associated with each circle of latitude comprises receiving a plurality of contiguous pictures with a panning error that is about five degrees or less.

20. The system of claim 13, wherein the overlapping ratio is about 40%.

21. A system comprising:
  a camera; and
  a computer readable medium having computer instructions stored thereon that when executed perform a method comprising:
  determining a number of circles of latitude on the basis of a focal length of the camera, a dimension of pictures associated with the camera system, and an overlapping ratio between contiguous ones of the pictures;
  receiving a plurality of contiguous pictures associated with each circle of latitude; and
  building a spherical panorama from the plurality of contiguous pictures, wherein determining the number of circles of latitude is performed in accordance with the following equation:

$$NumCircles = \left\lceil \frac{180°}{(100-k)\% * \left[2\tan^{-1}\left(\frac{a}{2f}\right)\right]} - 1 \right\rceil$$

where:
- a is a height of the pictures associated with the camera system;
- f is the focal length of the camera system; and
- k is the overlapping ratio between contiguous pictures.

22. The system of claim 21, wherein the number of circles of latitude is odd.

23. The system of claim 21, wherein the computer readable medium further comprises computer instructions that when executed perform:
- determining a number of the plurality of contiguous pictures associated with each circle of latitude.

24. The system of claim 23, wherein determining the number of the plurality of contiguous pictures associated with each circle of latitude is based on the following:

$$NumPictures(a, f, k) = \left\lceil \frac{360°}{\tan^{-1}\left(\frac{2f}{a}\right) * (100-k)\%} \right\rceil.$$

25. The system of claim 21, wherein the receiving a plurality of contiguous pictures associated with each circle of latitude comprises receiving a plurality of contiguous pictures with a panning error that is about five degrees or less.

26. The system of claim 21, wherein the overlapping ratio is about 40%.

* * * * *